United States Patent Office 3,845,014
Patented Oct. 29, 1974

3,845,014
METAL COMPOUNDS OF POLYCARBAMOYL-AMIDRAZONES
Dieter Frank, Elsenfeld, Walter Brodowski, Amorbach, and Peter Hentschel, Kleinheubach, Germany, assignors to Akzona Incorporated, Asheville, N.C.
No Drawing. Filed Dec. 15, 1971, Ser. No. 208,427
Claims priority, application Germany, Dec. 16, 1970, P 20 61 896.6
The term of this patent subsequent to June 26, 1990, has been disclaimed
Int. Cl. C08g 22/02, 33/10
U.S. Cl. 260—47 CB                    12 Claims

ABSTRACT OF THE DISCLOSURE

Metal compounds of polycarbamoylamidrazones where at least one metal selected from the class consisting of the metals of Groups IIa, IIIa, IVa, Va, VIII, Ib, IIb, IIIb, IVb and Vb of the long periodic system of elements is chelated in complex combination with a polycarbamoyl-amidrazone, such that the resulting metal-containing polymer is relatively temperature resistant and dimensionally stable and often provides a desirable color to the polymer.

---

In our copending application, filed in Germany on Dec. 16, 1970, as File No. P 20 61 896.6 (GW 1565) and filed in the United States concurrently herewith as Ser. No. 208,470, filed Dec. 15, 1971 now U.S. Pat. 3,741,993, there are disclosed the new polymers designated as "polycarbamoylamidrazones" which consist essentially of recurring units of the formula $$\left[ -R'N-N=C-R-C=N-NR'-C-NH-R'''-NH-C- \atop \phantom{-R'N-N=}\underset{NHR''}{|}\phantom{-R-}\underset{NHR''}{|}\phantom{=N-NR'-}\underset{O}{\|}\phantom{-NH-R'''-NH-}\underset{O}{\|} \right]$$

wherein R is a direct chemical bond or single linkage between the two carbon atoms as exemplified by oxalic acid bisamidrazone or R may also be alkylene of 3 to 10 carbon atoms or an aromatic radical, especially phenyl as exemplified by iso- or terephthalic acid bisamidrazones. R' represents hydrogen or methyl, R" represents hydrogen or phenyl, i.e. so as to provide amidrazones which may or may not be substituted in the 1,1' or 3,3' positions, respectively. R''' represents the divalent organic radical of the initial diisocyanate monomer having an essentially hydrocarbon structure of 2 up to about 14 carbon atoms. Thus, R''' can be a straight or branched chain saturated aliphatic radical of preferably 2 to 12 carbon atoms, e.g. various alkylenes and methyl or ethyl substituted alkylenes. R''' may further represent cycloaliphatic, especially cyclohexyl or aliphatic/cycloaliphatic such as methylcyclohexyl. R''' can also be an aromatic, araliphatic or aromatic ether radical such as phenyl, diphenyl, naphthyl, diphenyl methane, diphenyl ether or the like. In requiring essentially hydrocarbon structures in all of these organic radicals, the isolated presence of an oxygen ether atom or the like has no significant effect on the generally hydrocarbon structure. The preparation of these polycarbamoyl-amidrazones has also been disclosed in detail in said copending application which is therefore incorporated herein by reference as fully as if set forth in its entirety.

In essence, the polycarbamoylamidrazones are produced by reacting at least one bisamidrazone of the formula $$HR'N-N=C-R-C=N-NR'H \atop \phantom{HR'N-N=}\underset{NHR''}{|}\phantom{-R-}\underset{NHR''}{|}$$

with one or more diisocyanates of the formula

OCN—R'''—NCO, where R, R', R" and R''' have the same meaning as set forth above, in an inert organic solvent or mixture of such solvents at temperatures of 0–100° C. and preferably 15–50° C. while cooling to withdraw the heat of the exothermic reaction and stirring, mixing or agitating thoroughly. Lithium chloride can be added as a solubilizer or chain-lengthening agent, and the reaction is preferably sufficient to achieve a high molecular weight polymer with an inherent viscosity of at least 0.1 up to about 3.1, measured on 0.5 grams of the polymer dissolved in 100 ml. of dimethylformamide containing 5% by wt. of LiCl at 20° C., using an Ubbelohde viscosimeter.

Suitable bisamidrazones for purposes of this invention include, for example, oxalic acid bisamidrazone, adipic acid bisamidrazone; sebacic acid bisamidrazone; terephthalic acid bisamidrazone; isophthalic acid bisamidrazone; $N^1,N^{1'}$-dimethyloxalic acid bisamidrazone; and $N^3,N^{3'}$-diphenyl-oxalic acid bisamidrazone.

Examples of suitable diisocyanates include the following compounds:

1,4-phenylene-diisocyanate;
4,4'-diphenylether-diisocyanate;
4,4'-diphenylmethane-diisocyanate;
4,4'-dicyclohexylmethane-diisocyanate;
1,5-naphthalene-diisocyanate;
hexamethylene-diisocyanate;
2,2,4-trimethyl-hexamethylene-1,6-diisocyanate;
2,4,4-trimethyl-hexamethylene-1,6-diisocyanate;
3-isocyanatomethyl-3,5,5-trimethylcyclohexyl-1-isocyanate;
1-methylbenzene-2,6-diisocyanate; and
1-methylbenzene-2,4-diisocyanate.

Metal compounds of the following polycarbamoyl-amidrazones possess especially good properties:

Poly-(dicyclohexylmethane - 4,4' - dicarbamoyl - oxalic acid bisamidrazone);
Poly-(diphenylmethane - 4,4' - dicarbamoyl-oxalic acid bisamidrazone);
Poly-(diphenylether - 4,4' - dicarbamoyl - oxalic acid bisamidrazone);
Poly-(dicyclohexylmethane - 4,4' - dicarbamoyl isophthalic acid bisamidrazone);
Poly-(1 - methylbenzene - 2,6 or -2,4-dicarbamoyl-oxalic acid bisamidrazone);
Poly - (2,2,4- or 2,4,4 - trimethylhexamethylene-1,6-dicarbamoyl-isophthalic acid bisamidrazone);
Poly-(dicyclohexylmethane - 4,4' - dicarbamoyl-$N^3,N^{3'}$-diphenyl-oxalic acid bisamidrazone);
Poly-(dicyclohexylmethane - 4,4' - dicarbamoyl-adipic acid bisamidrazone);
Poly-(3 - carbamoylmethyl - 3,5,5 - trimethylcyclohexyl-carbamoyl-oxalic acid bisamidrazone); and
Poly-(dicyclohexylmethane - 4,4' - dicarbamoyl-$N^1,N^{1'}$-dimethyloxalic acid bisamidrazone).

It has now been found, in accordance with the present invention, that additional and valuable products are obtained in the form of the chelated reaction product of (A) said polycarbamoylamidrazone with (B) said at least one metal, the metallization essentially being carried out by reacting said polycarbamoylamidrazone with said at least one metal as a compound thereof dissolved in water or an organic solvent at a temperature between about room temperature and the boiling point of the solution.

The metal component is essentially chemically bound to the polycarbamoylamidrazone of the invention, i.e. in complex form such as in an enolate. This means that the metal is chelated to the polymer to form a stable chemical compound which is not easily broken down or decomposed under most normal conditions of subsequent use. Several possibilities can be taken into consideration regarding the structure of the complexes, where the metal atom may be bound either by the nitrogen atoms of the acylamidrazone grouping only, or additionally under participation of the carbonyloxygen atom. Furthermore, the chelation may be effected intramolecularly as well as intermolecularly.

The proportion of the metal component in the polymer can vary widely from as little as 0.1% by weight up to the saturation point or saturation range, i.e. where chelation will no longer occur. Unless there is a special reason to maximize the metal content, it usually will not exceed 50% by weight with reference to the polymer, and in most instances this content will desirably range from about 5 to 40% by weight and preferably about 7 to 30% by weight. It is not essential to incorporate a single metal into the polymer because it is also quite feasible and sometimes desirable to include two or more metals in the polycarbamoylamidrazone-metallic compounds.

The metal-containing polymers according to the invention are practically non-softening materials which retain their shape and form quite well under the effect of relatively high temperatures. In most cases, these metal-containing polycarbamoylamidrazones have a relatively weak to strong intrinsic and internal or self-dyed coloration depending upon the particular metal or metals being bound to the polymer. The non-metallized polycarbamoylamidrazone on the other hand is always a relatively colorless white to antique white. A few preferred metals and the colors which they impart to the polymer, e.g. to a poly-(dicyclohexylmethane - 4,4' - dicarbamoyloxalic acid bisamidrazone), are as follows:

Sb-, Sn-, Pb-, Cd and Zn=yellow to green
Bi and Au=orange to brown
Cu and Ni=green
Ag=black.

The full range of colors in combining various metals with different polymers will be apparent from the examples below.

The chelated reaction products of the invention can be readily extruded into shaped articles, or the polymer alone can be extruded as indicated in our above noted copending application and then be chelated or reacted with the metal compound. The products of the present invention further represent valuable metal compounds which can often be used to advantage under circumstances where one cannot employ lower molecular weight metal compounds, e.g. on account of their solubility or lack of stability. In this respect, the metallized polymers of this invention are often most useful in catalytic processes where the metal is known to be an active catalyst, the polymer essentially serving as an inert and/or expendable carrier.

The production of the new metal-containing polymers or chelated reaction products of the invention essentially requires reaction through intimate contact of the defined polycarbamoylamidrazones with a solution of at least one solvent-soluble compound of the desired metal component.

The polycarbamoylamidrazone to be treated can be present in solid form, for example as a granulate, powder, film, sheet, fabric or the like which is then immersed in a bath of the solution of the metal compound. One can also spray a solution of the metal compound onto the surface of the solid polycarbamoylamidrazone. It is further possible and most desirable in achieving the strongest or most penetrating treatment to conduct the meallizing reaction with the polycarbamoylamidrazone in dissolved form in its own solvent, for example as a solution in dimethylformamide containing at least a small amount of lithium dichloride (LiCl). In all cases, suitable metal compounds for the reaction include both inorganic and organic salts and also complex compounds of the metals, provided such compounds are soluble in at least one treating solvent. The choice of the metal compound is largely a matter of cost, availability and readily determined solubility properties.

Thus, it is advantageous to carry out the reaction of the polycarbamoylamidrazone with a solution of the metal compound or compounds in a solvent selected from the group consisting of water, methanol, dimethylformamide, dimethylacetamide, N-methylpyrrolidone, dimethylsulfoxide and mixtures thereof. Especially suitable are solvent mixtures of dimethylformamide/water, dimethylformamide/methanol and methanol/water.

The take-up or quantitative attachment by chelation of the metal is influenced by a number of parameters. However, for the production of any specific polymer/metal combination, the most suitable process or treatment conditions can be easily determined by a few preliminary and simple tests. Among the major influences there should be considered the following:

1. The amount of metal which can be taken up by the polymer depends upon the chemical composition of the polymer and the particular metal salt in each instance, all other parameters being constant (compare Examples 1–117 of Table I);
2. Increasing the concentration of the metal salt in the treatment bath tends to cause a higher take up of the metal over equivalent treatment periods (compare Example 118);
3. A temperature increase in general causes a faster take up of the metal (compare Example 119). In most cases, however, the speed of this take up or the reaction velocity itself is sufficiently rapid so that the treatment of the polycarbamoylamidrazone with the metal salt solution can be advantageously carried out at about room temperature;
4. The metal take up depends very strongly on the pH-value of the solution of the metal salt or dissolved metal. It rises with increasing pH-value (compare Example 120) so that use of an acid solution of the metal compound is often most advantageous;
5. Where the polymer has a high degree of swelling or partial dissolution, the speed of the metal take up is higher. Such swelling can be brought about either by the solvent used for the metal salt solution itself and/or by another solvent which acts as a swelling agent for the polymer (compare Example 121).

In the illustrative examples which follow, there is tabulated a large number of specific combinations as between the polymer, metal and solvent as well as a variation in treatment conditions. The following abbreviations are used in all of these examples:

RT = Room temperature
PCO = Polycarbamoylamidrazone
OAB = Oxalic acid bisamidrazone
DMOAB = $N^1,N^{1'}$-Dimethyloxalic acid bisamidrazone
DPOAB = $N^3,N^{3'}$-Diphenyloxalic acid bisamidrazone
AAB = Adipic acid bisamidrazone
IPAB = Isophthalic acid bisamidrazone
DMF = Dimethylformamide
DCMDI = Dicyclohexylmethane-4,4'-diisocyanate
MDI = Diphenylmethane-4,4'-diisocyanate
DPEDI = Diphenylether-4,4'-diisocyanate
TMDI = 2,2,4- and 2,4,4-trimethylhexamethylene-1,6-diisocyanate isomeric mixture
IPDI = 3-Isocyanatomethyl-3,5,5-trimethylcyclohexylisocyanate
TDI = 1-methylbenzene-2,6- and -2,4-diisocyanate isomeric mixture.

Examples 1 to 117

In each of the examples tabulated below, except as noted, 1 gram of dry, finely divided polycarbamoylamidrazone as a powder was suspended in 100 ml. of an 0.3 molar methanol solution of the designated metal salt, which corresponds to a ten molar excess of the metal salt in contrast with the polymer. In Example 14 a double or two times molar excess of the metal salt was employed while in Example 22 this molar excess of the metal salt amounted to fifteen. As metal salts, the chlorides were found to be useful in almost all cases. In place of the chlorides of silver and lead which are insoluble in methanol, there were used silver nitrate in dimethyl formamide and lead-II-acetate in methanol. Unless otherwise noted, the suspension was heated under reflux for three hours. The resulting chelated complex metal compound of the polycarbamoylamidrazone was then filtered off by suction from the suspension, and the recovered metallized product was washed with methanol and dried.

The following Table 1 lists not only the individual metal salts and solvents used in each example but also indicates where room temperature was used as the reaction temperature rather than the boiling or reflux temperature. Also, the table lists the amount of the metal taken up by the polymer in the final product as well as the color of this metallized product.

TABLE 1

| Ex. No. | Metal compound | Solvent | Amount of metal taken up by polymer (percent by wt.) | Color of reaction product |
|---|---|---|---|---|
| *PCO consisting of OAB/DCDMI* | | | | |
| 1 | $Ca(OAc)_2 \cdot xH_2O$ | Methanol | 2 | Unchanged. |
| 2 | $Ba(OAc)_2$ | do | 1–1.5 | Do. |
| 3 | $SrCl_2 \cdot 6H_2O$ | do | 1 | Do. |
| 4 | $AlCl_3 \cdot 6H_2O$ | Methanol, RT | 1.7 | Do. |
| 5 | $Ga_2(SO_4)_3$ | Methanol | 0.6 | Do. |
| 6 | TlCl | do | 0.1 | Do. |
| 7 | $GeCl_4$ | Methanol, RT | 0.1 | Do. |
| 8 | $SnCl_2(\cdot 2H_2O)$ | Methanol | 25 | Light yellow. |
| 9 | $Pb(OAc)_2 \cdot 3H_2O$ | do | 22 | Yellow. |
| 10 | $SbCl_3$ | do | 18–22 | Strong yellow. |
| 11 | $BiCl_3$ | do | 27–33 | Orange. |
| 12 | $CuCl_2$ | do | 12 | Dark green to black. |
| 13 | $AgNO_3$ | DMF, RT | 11 | Brown. |
| 14 | $HAuCl_4 \cdot 4H_2O$ | Methanol, RT | 19 | Dark brown. |
| 15 | $ZnCl_2$ | Methanol | 12–13 | Light yellow to green. |
| 16 | $CdCl_2 \cdot H_2O$ | do | 13 | Unchanged. |
| 17 | $HgCl_2$ | do | 6 | Yellowish. |
| 18 | $Ce(NO_3)_3 \cdot 6H_2O$ | do | 12–13.5 | Do. |
| 19 | $Th(NO_3)_4 \cdot 4H_2O$ | do | 13.5 | Do. |
| 20 | $UCl_4$ (90% ig) | Methanol, RT | 18–23 | Green-yellow. |
| 21 | $ZrCl_4$ | do | 16–19 | Yellowish. |
| 22 | $NbCl_5$ | do | 12 | Orange-brown. |
| 23 | $CoCl_2 \cdot 6H_2O$ | Methanol | 6–8 | Black. |
| 24 | $NiCl_2 \cdot 6H_2O$ | do | 7–8 | Light green. |
| 25 | $RhCl_3 \cdot xH_2O$ | do | 5 | Orange. |
| 26 | $PdCl_2$ | do | 5 | Black-brown. |
| 27 | $Na_2[IrCl_6]$ | do | 5 | Beige. |
| *PCO consisting of OAB/MDI* | | | | |
| 28 | $SnCl_2$ | Methanol | 18 | Lemon yellow. |
| 29 | $SbCl_3$ | do | 6 | Yellow. |
| 30 | $BiCl_3$ | do | 32 | Do. |
| 31 | $CuCl_2$ | do | 12 | Olive green. |
| 32 | $ZnCl_2$ | do | 6 | Light yellow. |
| 33 | $CdCl_2 \cdot H_2O$ | do | 7 | Unchanged. |
| 34 | $HgCl_2$ | do | 4 | Light yellow. |
| 35 | $NiCl_2 \cdot 6H_2O$ | do | 7 | Light green. |
| 36 | $Pb(OAc)_2 \cdot 3H_2O$ | do | 29 | Yellow. |
| 37 | $AgNO_3$ | DMF, RT | 14 | Brown. |
| 38 | $Ce(NO_3)_3 \cdot 6H_2O$ | Methanol | 16 | Sand colored. |
| 39 | $Th(NO_3)_4 \cdot 4H_2O$ | do | 22 | Light yellow. |
| *PCO consisting of OAB/DPEDI* | | | | |
| 40 | $SnCl_2$ | Methanol | 22 | Yellow. |
| 41 | $SbCl_3$ | do | 6 | Do. |
| 42 | $BiCl_3$ | do | 27 | Orange. |
| 43 | $CuCl_2$ | do | 11 | Olive green. |
| 44 | $ZnCl_2$ | do | 10 | Light yellow. |
| 45 | $CdCl_2 \cdot H_2O$ | do | 9 | Unchanged. |
| 46 | $NiCl_2 \cdot 6H_2O$ | do | 2 | Green. |
| 47 | $Pb(OAc)_2 \cdot 3H_2O$ | do | 25 | Yellow. |
| 48 | $AgNO_3$ | DMF, RT | 18 | Dark brown. |
| 49 | $Ce(NO_3)_3 \cdot 6H_2O$ | Methanol | 12 | Beige. |
| 50 | $Th(NO_3)_4 \cdot 4H_2O$ | do | 22 | Light yellow. |
| *PCO from OAB/TMDI* | | | | |
| 51 | $SnCl_2$ | Methanol | 30 | Yellow. |
| 52 | $BiCl_3$ | do | 35 | Yellow-green. |
| 53 | $CuCl_2$ | do | 15 | Black. |
| 54 | $ZnCl_2$ | do | 13 | Light yellow. |
| 55 | $CdCl_2 \cdot H_2O$ | do | 25 | Do. |
| 56 | $NiCl_2 \cdot 6H_2O$ | do | 7 | Green. |
| 57 | $Pb(OAc)_2 \cdot 3H_2O$ | do | 10 | Unchanged. |
| 58 | $Ce(NO_3)_3 \cdot 6H_2O$ | do | 19 | Olive green. |
| 59 | $Th(NO_3)_4 \cdot 4H_2O$ | do | 30 | Light yellow. |
| *PCO from OAB/IPDI* | | | | |
| 60 | $SnCl_2$ | Methanol | 27 | Lemon yellow. |
| 61 | $SbCl_3$ | do | 29 | Unchanged. |
| 62 | $BiCl_3$ | do | [1] 40 | Yellow green. |
| 63 | $CuCl_2$ | do | 15 | Black. |
| 64 | $ZnCl_2$ | do | 12 | Light yellow. |
| 65 | $CdCl_2 \cdot H_2O$ | do | 16 | Unchanged. |
| 66 | $NiCl_2 \cdot 6H_2O$ | do | 7 | Light green. |
| 67 | $Pb(OAc)_2 \cdot 3H_2O$ | do | 31 | Yellow. |
| 68 | $AgNO_3$ | DMF, RT | 13 | Dark brown. |
| 69 | $Th(NO_3)_4 \cdot 4H_2O$ | Methanol | 27 | Unchanged. |
| *PCO from OAB/TDI* | | | | |
| 70 | $SnCl_2$ | Methanol | 23 | Yellow. |
| 71 | $SbCl_3$ | do | 10 | Do. |
| 72 | $BiCl_3$ | do | 28 | Do. |
| 73 | $CuCl_2$ | do | 13 | Green. |

See footnote at end of table.

TABLE 1—Continued

| Ex. No. | Metal compound | Solvent | Amount of metal taken up by polymer (percent by wt.) | Color of reaction product |
|---|---|---|---|---|
| PCO from OAB/TDI | | | | |
| 74 | $ZnCl_2$ | Methanol | 12 | Yellowish. |
| 75 | $CdCl_2 \cdot H_2O$ | do | 14 | Unchanged. |
| 76 | $FeCl_3$ | do | 10 | Dark gray. |
| 77 | $NiCl_2 \cdot 6H_2O$ | do | 6 | Light green. |
| 78 | $Pb(OAc)_2 \cdot 3H_2O$ | do | 34 | Yellow. |
| 79 | $AgNO_3$ | DMF, RT | 21 | Brown. |
| 80 | $Ce(NO_3)_3 \cdot 6H_2O$ | Methanol | 14 | Sand color. |
| 81 | $Th(NO_3)_4 \cdot 4H_2O$ | do | 14 | Unchanged. |
| PCO from DMOAB/DCMDI | | | | |
| 82 | $SnCl_2$ | Methanol | 15 | Yellow-green. |
| 83 | $BiCl_3$ | do | 30 | Yellow. |
| 84 | $CuCl_2$ | do | 10 | Dark green. |
| 85 | $ZnCl_2$ | do | 8 | Yellowish. |
| 86 | $Pb(OAc)_2 \cdot 3H_2O$ | do | 3 | Unchanged. |
| PCO from DPOAB/DCMDI | | | | |
| 87 | $SnCl_2$ | Methanol | 23 | Yellow. |
| 88 | $SbCl_3$ | do | 14 | Do. |
| 89 | $BiCl_3$ | do | 23 | Do. |
| 90 | $ZnCl_2$ | do | 14 | Light yellow. |
| 91 | $CdCl_2 \cdot H_2O$ | do | 9 | Do. |
| 92 | $NiCl_2 \cdot 6H_2O$ | do | 10 | Yellow green. |
| 93 | $Pb(OAc)_2 \cdot 3H_2O$ | do | 18 | Yellow. |
| 94 | $AgNO_3$ | DMF, RT | 15 | Brown. |
| 95 | $Ce(NO_3)_3 \cdot 4H_2O$ | Methanol | 13 | Yellow. |
| 96 | $Th(NO_3)_4 \cdot 4H_2O$ | do | 23 | Do. |
| PCO from AAB/DCMDI | | | | |
| 97 | $BiCl_3$ | Methanol | ¹ 35 | Pink. |
| 98 | $ZnCl_2$ | do | 12 | Red-violet. |
| 99 | $CdCl_2 \cdot H_2O$ | do | 18 | Light red. |
| 100 | $NiCl_2 \cdot 6H_2O$ | do | 5 | Pink-red. |
| 101 | $Pb(OAc)_2 \cdot 3H_2O$ | do | 29 | Red. |
| 102 | $AgNO_3$ | DMF, RT | 20 | Black. |
| 103 | $Ce(NO_3)_3 \cdot 6H_2O$ | Methanol | 9 | Orange. |
| 104 | $Th(NO_3)_4 \cdot 4H_2O$ | do | 25 | Light red. |
| PCO from IPAB/DCMDI | | | | |
| 105 | $BiCl_3$ | Methanol | 40 | Unchanged. |
| 106 | $ZnCl_2$ | do | 13 | Do. |
| 107 | $CdCl_2 \cdot H_2O$ | do | 5 | Do. |
| 108 | $NiCl_2 \cdot 6H_2O$ | do | 9 | Yellow green. |
| 109 | $Pb(OAc)_2 \cdot 3H_2O$ | do | 22 | Unchanged. |
| 110 | $AgNO_3$ | DMF, RT | 17 | Brown. |
| 111 | $Ce(NO_3)_3 \cdot 4H_2O$ | Methanol | 14 | Unchanged. |
| PCO from IPAB/TMDI | | | | |
| 112 | $BiCl_3$ | Methanol | 40 | Unchanged. |
| 113 | $ZnCl_2$ | do | 15 | Light yellow. |
| 114 | $CdCl_2 \cdot H_2O$ | do | 12 | Unchanged. |
| 115 | $NiCl_2 \cdot 6H_2O$ | do | 8 | Olive green. |
| 116 | $Pb(OAc)_2 \cdot 3H_2O$ | do | 29 | Beige. |
| 117 | $Ce(NO_3)_3 \cdot 4H_2O$ | do | 17 | Sand color. |

¹ Approximate.

Example 18

A dry PCO-film composed of oxalic acid bisamidrazone and DCMDI (thickness=20–25 millimicrons; surface= approx. 180 cm.² weighing about 330–350 milligrams) was treated with 100 ml. of a solution of tin-II-chloride or uranium-IV-chloride in various molar concentrations in methanol while stirring at room temperature. The amount of metal taken up as a percentage by weight with reference to the polymer is given in each instance in Table 2, according to different concentrations and periods of treatment.

TABLE 2

| Metal salt | Concentration, mole/l. | Treatment time (minutes) | Metal taken up by polymer (percent by wt.) |
|---|---|---|---|
| $SnCl_2$ | 0.1 | 5 | 7.5 |
| | 0.01 | 5 | 0.2 |
| | 0.001 | 3,850 | 0.9 |
| | 0.1 | 10 | 13.9 |
| | 0.01 | 10 | 0.5 |
| $UCl_4$ (90%) | 0.05 | 1,000 | 13.5 |
| | 0.01 | 1,000 | 4.8 |

Example 119

A polycarbamoylamidrazone of OAB and DCMDI in the form of a fabric prepared from filaments of the polymer was treated at two different temperatures with 100 ml. of an 0.1-molar solution of lead-II-acetate in methanol. The amount of metal taken up by the polymer after stirring for 16 hours at room temperature was about 8–9% by wt., while an amount of 22.4 percent by wt. of the metal was taken up after 4 hours of boiling under reflux.

Example 120

In each experiment, there was used a piece of PCO-foil composed of OAB and DCMDI of about 50 cm.² (approx. 100 mg.) in size which had been swollen in dimethyl formamide. The foil samples were treated for the same period of time and at the same temperature in each case with 90 ml. of an aqueous solution of 0.5 milliequivalent $Cu(NO_3)_2 \cdot 3H_2O$ while adjusting the pH to different values, using $HNO_3$ or $NH_4OH$ as needed. After washing with water and drying the metallized samples, the amount of copper taken up by each sample was determined. Three different samples at specific pH-values of the treating solution are given in Table 3.

TABLE 3

| pH-value | Amount of copper taken up by polymer percent by wt. |
| --- | --- |
| 1.1 | 0.4 |
| 7.0 | 1.6 |
| 10.3 | 13.9 |

Example 121

A dry film of the polycarbamoylamidrazone composed of OAB and DCMDI took up about 0.5% by weight of copper from an 0.2 molar aqueous copper chloride solution within about 24 hours. By comparison, the same film which had first been swollen in dimethylformamide took up 11% by weight of copper under otherwise the same conditions. A good metal take-up (12%) was also observed if the dry foil is immersed for 24 hours in a 2 molar solution of copper-II-chloride in methanol. In each of these three cases, the molar excess of copper-II-chloride amounted to ten times with reference to the polymer.

Example 122

1 gram (2.6 millimols) of a powdery polycarbamoylamidrazone composed of OAB and DCMDI were stirred in a solution of 1.75 grams (13 millimols) of copper-II-chloride and 1.77 grams (13 millimols) of zinc-II-chloride in 100 ml. of methanol for a period of 20 hours at room temperature. After filtration under suction, washing with methanol and drying in a vacuum, the polymer had a content of copper of 5.4% by weight and a content of zinc of 7.8%.

Example 123

1 gram (2.6 millimols) of the polycarbamoylamidrazone of OAB/DCMDI in the form of a fabric was stirred for 20 hours at room temperature in a solution of 0.70 grams (5.2 millimols) of copper-II-chloride, 0.71 grams (5.2 millimols) of zinc-II-chloride and 0.99 grams (5.2 millimols) of tin-II-chloride in 100 ml. of methanol. The metallized product, after washing with methanol and drying in a vacuum, was analyzed for the metal contents and gave the following contents: copper=10.9% by weight; zinc=0.75% by weight and tin=8.1% by weight.

Example 124

1 gram of a dry PCO-powder composed of OAB and DCMDI were stirred in a solution of 2.5 grams (13 millimols) of tin-II-chloride in 100 ml. of dimethyl sulfoxide for 20 hours at room temperature. After filtering off the product, washing with water and drying, the metallized polymer had a tin content of 14.2% by weight.

Example 125

1 gram of the polymer powder (PCO composed of OAB and DCMDI) was stirred in a solution of 4.9 grams (13 millimols) of lead-II-acetate (hydrated, i.e. ×3H₂O) in 100 ml. of N-methylpyrrolidone for 20 hours at room temperature. After filtering off, washing and drying in the conventional manner, the content of lead in the metallized polymer amounted to 9.5% by weight.

The following references are cited as an aid to the preparation of the bisamidrazones identified in the foregoing description, all of which are known compounds:

British Pat. No. 735,175 and copending U.S. Application Serial No. 838,429, filed July 2, 1969, both for the production of N¹,N¹'-dimethyl oxalic acid bisamidrazone by reaction of oxaldiimidic acid diethyl or dimethyl ester and methyl hydrazine and also for the production of N³,N³'-diphenyl oxalic acid bisamidrazone by reaction of water-free hydrazine with bis-(phenyl)oximide chloride;

Curtius et al., J. pract. Chem., Vol. 50, page 241 (1894) and Vol. 52, page 272 (1895), for the production of oxalic acid bisamidrazone by the reaction of dicyanogen with hydrazine solution;

H. Weidinger et al., Chem. Ber., Vol. 96, page 1064 (1963) and Vol. 97, page 1599 (1964) for the production of oxalic acid bisamidrazone by reaction of oxaldiimidic acid ester with hydrazine hydrate; and W. Ried et al., Liebigs Ann. Chem., Vol. 714, page 128 (1968) for the production of terephthalic acid bisamidrazone and the analogous isophthalic, adipic and sebacic acid bisamidrazones by reaction of the diimidic acid diethyl esters with hydrazine hydrate.

The invention is hereby claimed as follows:

1. The chelated reaction product obtained by metallizing (A) a polycarbamoylamidrazone consisting essentially of recurring units of the formula

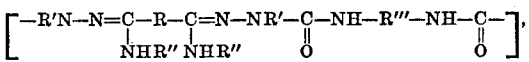

wherein R is a direct chemical bond, alkylene of 3 to 10 carbon atoms or aryl, R' represents hydrogen or methyl, R'' represents hydrogen or phenyl and R''' is a divalent organic radical having an essentially hydrocarbon structure of 2 up to about 14 carbon atoms, by chelating reaction with (B) at least one metal selected from the class consisting of metals of Groups IIa, IIIa, IVa, Va, VIII, Ib, IIb, IIIb, IVb and Vb of the long periodic system of elements, said metal being in the form of a compound thereof dissolved in water or an organic solvent, and said reaction being carried out at a temperature between about room temperature and the boiling point of the solution.

2. The chelated reaction product as claimed in Claim 1 wherein the metal content is about 0.1 to 40% by weight.

3. The chelated reaction product as claimed in Claim 1 wherein said at least one metal is selected from the class consisting of antimony, tin, lead, cadmium, zinc, bismuth, gold, copper, nickel and silver.

4. A process for the metallization of a polycarbamoylamidrazone composed of recurring units of the formula

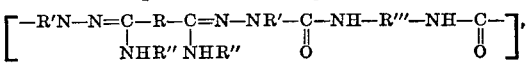

wherein R is a direct chemical bond, alkylene of 3 to 10 carbon atoms or aryl, R' represents hydrogen or methyl, R'' represents hydrogen or phenyl and R''' is a divalent organic radical having an essentially hydrocarbon structure of 2 up to about 14 carbon atoms, with at least one metal selected from the class consisting of metals of Groups IIa, IIIa, IVa, Va, VIII, Ib, IIb, IIIb, IVb and Vb of the long periodic system of elements, which process comprises:

reacting said polycarbamoylamidrazone for metal chelation with a solution of a compound of said metal in water or an organic solvent at a temperature of between about room temperature and the boiling point of the solution.

5. A process as claimed in Claim 4 wherein said metal is selected from the class consisting of antimony, tin, lead, cadmium, zinc, bismuth, gold, copper, nickel and silver.

6. A process as claimed in Claim 4 wherein said polycarbamoylamidrazone is selected from the class consisting of:

poly-(dicyclohexylmethane-4,4'-dicarbamoyl-oxalic acid bisamidrazone);

poly-(diphenylmethane - 4,4' - dicarbamoyl-oxalic acid bisamidrazone);

poly-(diphenylether - 4,4' - dicarbamoyl-oxalic acid bisamidrazone);

poly-(dicyclohexylmethane - 4,4' - dicarbamoyl - isophthalic acid bisamidrazone);

poly-(2,2,4- or 2,4,4-trimethylhexamethylene-1,6-dicarbamoyl-isophthalic acid bisamidrazone);

poly-(3-carbamoylmethyl - 3,5,5 - trimethylcyclohexylcarbamoyl-oxalic acid bisamidrazone);

poly-(1-methylbenzene-2,6- or -2,4-dicarbamoyl - oxalic acid bisamidrazone);

poly-(dicyclohexylmethane - 4,4' - dicarbamoyl-N³,N³'-diphenyl-oxalic acid bisamidrazone);

poly-(dicyclohexylmethane - 4,4' - dicarbamoyl-N¹,N¹'-dimethyl-oxalic acid bisamidrazone); and poly-(dicyclohexylmethane - 4,4' - dicarbamoyl - adipic acid bisamidrazone).

7. A process as claimed in Claim 4 wherein the metal compound is dissolved in water as the solvent.

8. A process as claimed in Claim 4 wherein the metal compound is dissolved in an organic solvent selected from the group consisting of methanol, dimethylformamide, N-methylpyrrolidone and dimethylsulfoxide.

9. A process as claimed in Claim 4 wherein the metal compound is an organic or inorganic salt of the metal.

10. A process as claimed in Claim 4 wherein the poly-carbamoylamidrazone is reacted with an acid solution of the metal compound.

11. A process as claimed in Claim 4 wherein the reaction is carried out substantially at room temperature.

12. A process as claimed in Claim 4 wherein the poly-carbamoylamidrazone is contacted in its swollen state with said solution of the metal compound.

References Cited
UNITED STATES PATENTS
3,661,836   5/1972   Schopf et al. _____ 260—78 TF HOWARD E. SCHAIN, Primary Examiner U.S. Cl. X.R.

260—77.5 R, 77.5 AM, 78 TF, 429 R, 429 J, 429.1, 429.2, 429.3, 429.5, 429.7, 429.9 430, 431, 435, 439, 438.1, 439, 440, 447, 448 R